Sept. 22, 1959      M. E. C. FREEMAN ET AL      2,905,216
FEEDER AND STEM END CUTTER FOR FRUIT PREPARATION MACHINE
Filed Aug. 16, 1954                              9 Sheets-Sheet 3

INVENTORS
MARSHALL E. C. FREEMAN
SHERMAN H. CREED
ARMANDO J. BARDINI
BY Hans G. Hoffmeister
ATTORNEY

Sept. 22, 1959     M. E. C. FREEMAN ET AL     2,905,216
FEEDER AND STEM END CUTTER FOR FRUIT PREPARATION MACHINE
Filed Aug. 16, 1954     9 Sheets-Sheet 4

INVENTORS
MASHALL E.C. FREEMAN
SHERMAN H. CREED
ARMANDO J. BARDINI
BY Hans G. Hoffmeister
ATTORNEY Sept. 22, 1959 M. E. C. FREEMAN ET AL 2,905,216
FEEDER AND STEM END CUTTER FOR FRUIT PREPARATION MACHINE
Filed Aug. 16, 1954 9 Sheets-Sheet 8

FIG_14

FIG_15  FIG_16

INVENTORS
MARSHALL E. C. FREEMAN
SHERMAN H. CREED
ARMANDO J. BARDINI
BY Hans G. Hoffmeister
ATTORNEY United States Patent Office 2,905,216
Patented Sept. 22, 1959

2,905,216

FEEDER AND STEM END CUTTER FOR FRUIT PREPARATION MACHINE

Marshall E. C. Freeman, San Jose, Sherman H. Creed, Campbell, and Armando J. Bardini, Los Altos, Calif., assignors to Food Machinery and Chemical Corporation, San Jose, Calif., a corporation of Delaware Application August 16, 1954, Serial No. 450,162

12 Claims. (Cl. 146—81)

The present invention pertains to a machine for processing fruit, and more particularly relates to an improved mechanism for feeding pears, or the like, to the several processing devices of a fruit preparation machine.

An object of the present invention is to provide a fruit feeding mechanism that is simple in design and efficient in operation.

Another object is to provide an improved device for centering a pear in a holder with the stem-blossom axis of the pear in a predetermined position.

Another object is to provide a novel cutter arrangement adapted to efficiently cut off the stem end of a pear.

Another object is to provide an improved mechanism for transferring a pear from a fed cup to a stemming tube.

Another object is to provide an improved pear centering and transporting cup.

Other and further objects and advantages will become apparent from the following description taken in connection with the accompanying drawings, in which:

Fig. 6 is a fragmentary elevation of a cup assembly.

Fig. 7 is a section taken along line 7—7 of Fig. 6.

Fig. 13 is a fragmentary elevation of a portion of the pear feeding side of the machine, with parts omitted to more clearly disclose the operating mechanism.

Figures 1, 3:
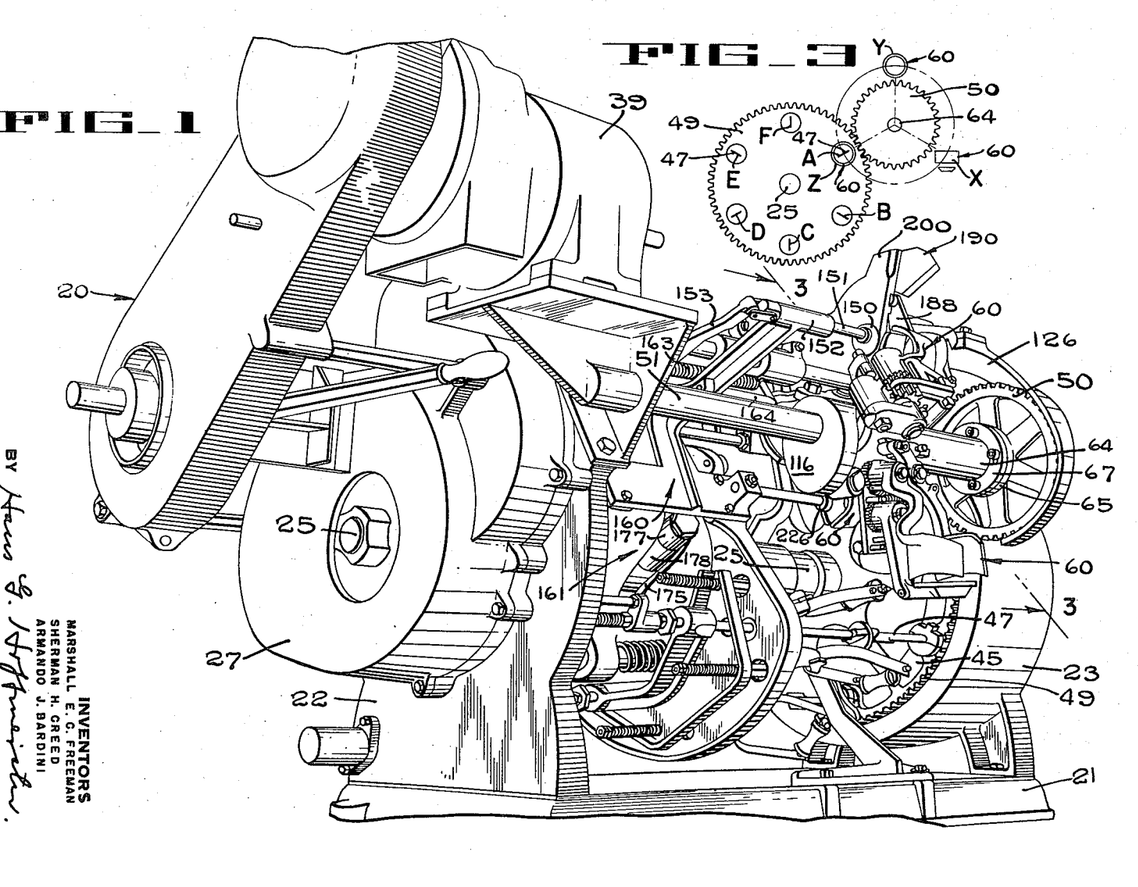
Fig. 1 is a fragmentary perspective of a pear preparation machine incorporating the novel apparatus of the present invention, said perspective showing one end and the pair feeding side of the machine.
Fig. 3 is a diagrammatic view of the turret end of the machine, taken along line 3—3 of Fig. 1.
Figure 2:
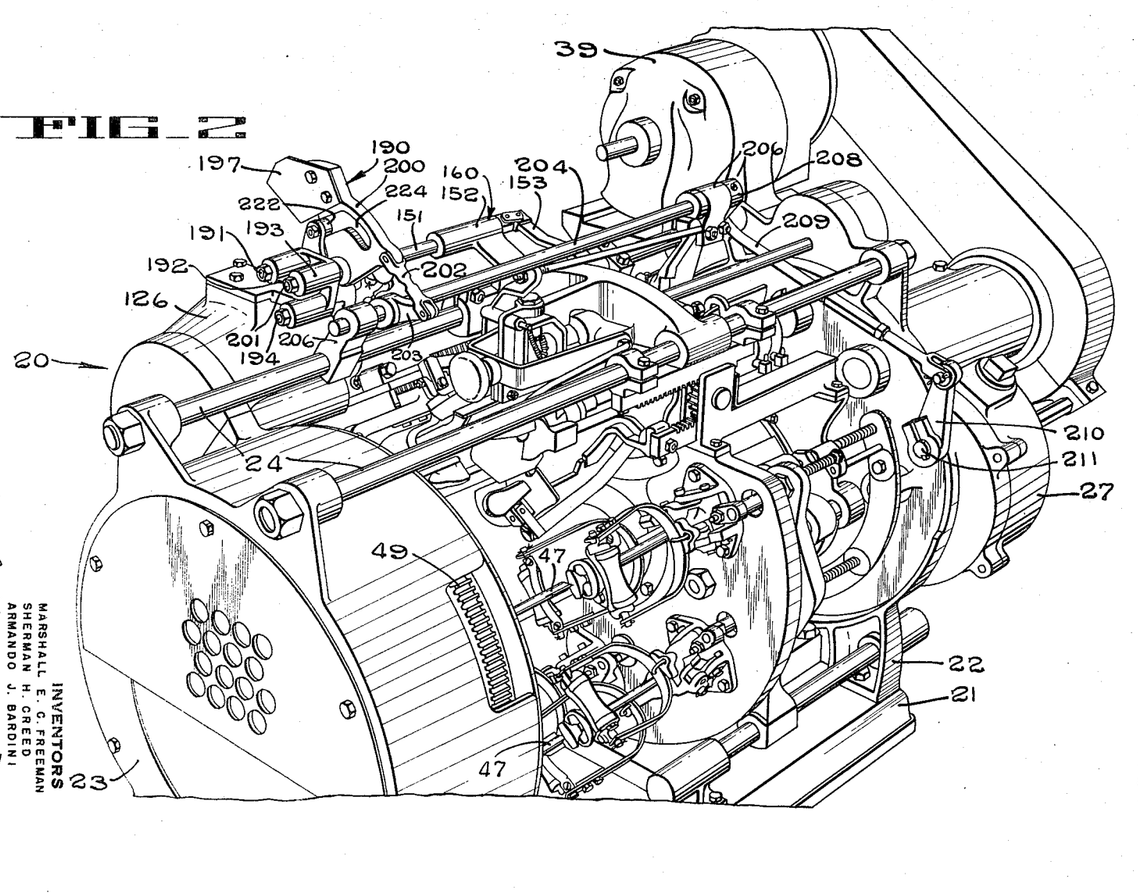
Fig. 2 is a fragmentary perspective of the machine of Fig. 1, showing the end and the side of the machine opposite to those shown in Fig. 1.

In Figs. 1 and 2 the reference numeral 20 indicates generally a pear processing machine incorporating the novel rotary pear processing apparatus of the present invention. Those parts of this machine that are not directly associated with the present pear processing apparatus are fully disclosed in the U.S. Patent No. 2,139,704 to Albert R. Thompson et. al. In general, the machine 20 comprises a rigid base 21 upon which is mounted a pair of end standards 22 and 23 rigidly interconnected by suitable longitudinal tie rods 24. A turret drive shaft 25 extends between the end standards 22 and 23 and is suitably journaled for rotation in bearing members (not shown) in these standards.

The turret drive shaft 25 projects beyond the end standard 22 into a gear chamber formed by a gear cover 27 secured to the outer face of the end standard. The shaft 25 is intermittently rotated in one-sixth of a revolution increments by means of a Geneva gear 28 (Fig. 4) disposed in the gear chamber and keyed to the shaft 25. The Geneva gear 28 is actuated by a driver gear 29 keyed to a shaft 30 and carrying the usual driver roller 31 which operates in radial slots 32 in the Geneva gear 28 for rotating the same. When the driver roller 31 is out of engagement with the Geneva gear 28 the gear 28 is locked against rotation by a locking ring 33 carried by the driver 29. The Geneva movement is driven from a continuously rotating main drive shaft 35 (Figs. 1 and 2) by means of a pinion gear 36 which is secured to the shaft 35 and disposed in mesh with gear teeth 37 (Fig. 4) formed on the periphery of the Geneva driver 29. Power for operating the main drive shaft 35 is supplied from an electric motor 39 by means of a chain 41 trained around a sprocket 42 that is keyed to the driven shaft of a clutch 40, on the shaft 35, and around a sprocket 43 keyed to the drive shaft 44 of the motor 39.

Figure 4:
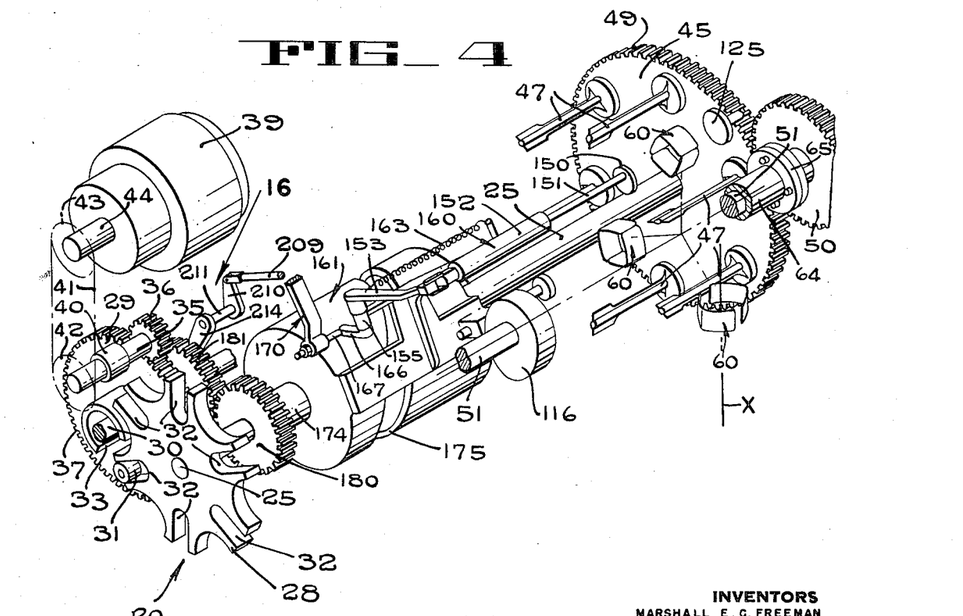
Fig. 4 is a diagrammatic perspective of the pear preparation machine of Fig. 1, particularly showing the power drive arrangement.

Fixed to the turret shaft 25 near the right-hand end, as viewed in Fig. 4, is a turret 45 provided with an annularly arranged series of stemming tubes 47, six in all in the illustrated embodiment, upon which the pears to be operated upon are impaled, stem end first, by a pear feeding mechanism to be described hereinafter. Gear teeth 49 are formed on the periphery of the turret 45 for meshing engagement with the teeth of a gear 50 rotatably mounted on a stationary shaft 51 that has one end held in fixed position in the end standards 22 and 23. When the shaft 25 is intermittently rotated in a clockwise direction (Fig. 3) in one-sixth revolution increments through the above-mentioned Geneva drive, the stemming tubes 47 are carried through six successive stations A, B, C, D, E and F, as shown diagrammatically in Fig. 3. At station A, a pear is transferred from the feed mechanism to the stemming tubes which carry the pear through the succeeding stations wherein the pears are peeled, split, cored, and trimmed by mechanisms described fully in the above-mentioned patent to Thompson et al.

In the present invention three cup assemblies 60 (Fig. 3) are mounted in spaced angular relation on a sleeve shaft 64 (Figs. 1 and 4) which is journaled on the stationary shaft 51. The sleeve shaft 64, which is connected to the hub 65 (Fig. 4) of the gear 50 by means of a coupling 67, acts as a turret to carry the three cups in a rotary path. When the gear 50 is angularly indexed in one-third of a revolution increments, a cup assembly disposed at the feed stations X (Fig. 4) will be shifted by the first indexing to station Y at which the stem end of the pear is cut off, and then during the second indexing will be moved to station Z which corresponds to station A of the stemming tube turret (Fig. 3). The third angular indexing of the gear 50 will bring the cup back to feed station X.

Figure 5:
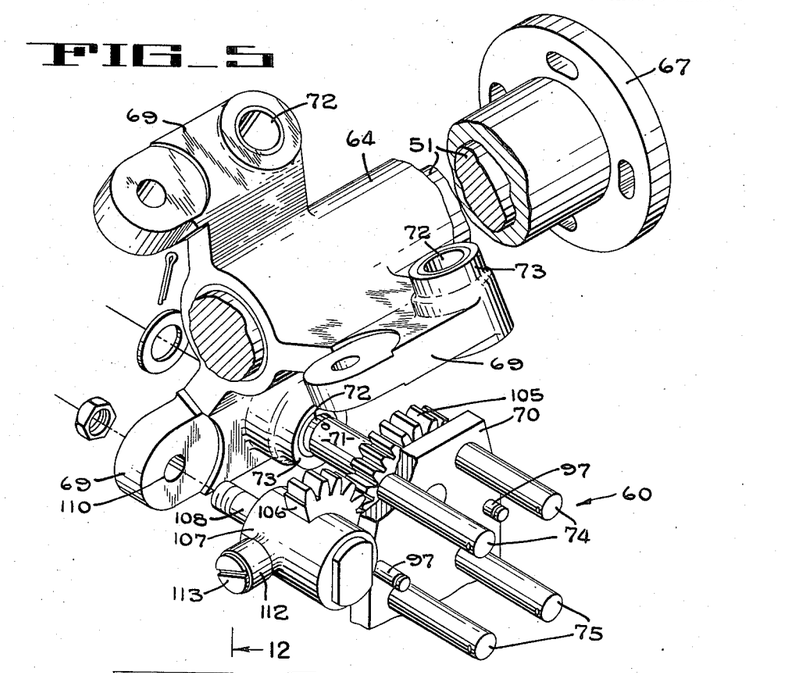
Fig. 5 is a fragmentary exploded perspective view of the cup support mechanism used in the machine of the present invention.

Each cup assembly is mounted on one of three flanges 69 (Fig. 5) which are integrally formed in spaced relation on the exterior surface of the sleeve shaft 64 and which extend in a generally radial direction outwardly from said sleeve. As clearly seen in Fig. 7 each flange 69 is slightly offset from a true radial plane of the sleeve. Each cup assembly 60 (Fig. 5) includes a flat mounting plate 70 having a stud 71 pressed therein and projecting rearwardly therefrom into a bushing 72 disposed in a hub 73 formed on the associated flange 69. The rotary movement of the stud 71 in the hub 73 permits movement of the cup assembly as a unit from the pear receiving position X to the pear cut off station Y (Fig. 3). The mounting plate 70 (Fig. 5) has two forwardly projecting upper studs 74 and two forwardly projecting lower studs 75. A pair of lower jaw arms 76 (Figs. 6 and 7) are pivotally mounted on the lower studs 75. Each lower jaw arm has a hub 77 disposed on the stud 75, a strap portion 78 extending radially outwardly from the hub 77 in a plane generally parallel to the mounting plate 70, and an end portion 80 of generally semi-circular configuration projecting at right angles from the outer end of the strap portion 78. As seen in Fig. 6, the end portions 80 cooperate to define a generally frusto-conical pocket adapted to receive the stem end of the pear. The lower jaw arms 76 are urged toward each other by two tension springs 83, each of which is connected between a pin 84 on the arm 76 and a pin 85 on the mounting plate 70. To assure simultaneous pivoting movement of the lower jaw arms 76 a gear wheel 86 is secured to the rear face of each hub 77 in concentric relation with the aperture in the hub. Since the gear wheels 86 are secured to the hubs 77 and are in mesh, pivoting movement of one of the lower jaw arms 76 will cause movement of the other also.

A pair of upper jaw arms 90 are pivotally mounted on the upper studs 74 which project forwardly from the mounting plate 70. Each upper jaw arm has a hub 91 disposed on a stud 74, and a strap portion 92 which extends radially outwardly from the hub 91 generally parallel to the mounting plate 70 and offset to clear the hub 77 of the lower jaw arm 76. At its outer end each upper jaw arm has an end portion 93 of generally semi-cylindrical configuration which projects at right angles to the plane of mounting plate 70. In closed position the end portions 93 cooperate to provide a generally cylindrical pocket which is directly above and in axial alignment with the frusto-conical pocket of the lower jaw arms 76. The cylindrical pocket of the upper jaw arms and the frusto-conical pocket of the lower jaw arms cooperate to provide a centering chamber for a pear. The upper jaw arms 90 are urged toward each other by two tension springs 95 each of which is connected between a pin 96 on the associated jaw arm 90 and a pin 97 on the mounting plate 70. In order that the upper jaw arms pivot in unison to move the outer end portions 93 toward and away from clamping position around a pear, a gear wheel 98 is pinned to the rear face of each hub portion 91 in concentric relation to the bearing aperture in the hub. As seen in Fig. 6, the gear wheels 98 are in mesh and, accordingly, when one upper jaw arm 90 is pivoted, the other arm will be simultaneously pivoted through the same angular displacement. The upper jaw arms are pivoted to closed position by the springs 95 and are pivoted to open position by the contact of a cam roller 99 (Fig. 6), which is rotatably mounted on a fixed arm 100 projecting upwardly from one of the upper jaw arms 92, with a slanted abutment member 102 that is adjustably mounted on the exterior of the sleeve shaft 64.

Bodily pivotal movement of each cup assembly from position X to position Y (Figs. 3 and 4) is effected by the inter-engagement of a gear segment 105 (Fig. 5), which is mounted on the rear face of the mounting plate 70, with a gear segment 106 secured to a cylindrical actuating member 107. The gear segment 105 is provided with teeth over an arc of more than 90°, which arc is concentric with the stud 71 which projects rearwardly from the mounting plate 70. The gear segment 106 is provided with teeth over an arc of more than 90°, which arc is concentric with a pin 108 which pivotally mounts the cylindrical actuating member 107 in an aperture 110 in the associated flange 69 of the sleeve shaft 64. When the actuating member is rotated, the mounting plate 70 is rotated to bodily shift the cup assembly mounted thereon from position X to position Y (Figs. 3 and 4) or vice versa.

Figure 11:
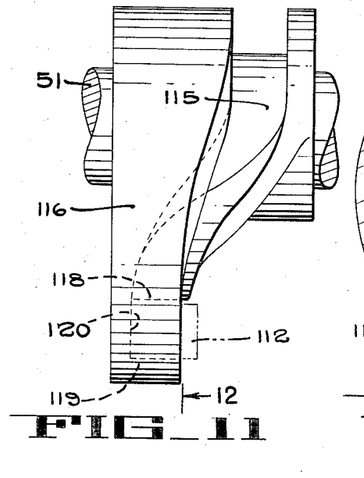
Fig. 11 is a fragmentary elevation of the feed turret control cam used in the present pear preparation machine.
Figure 12:
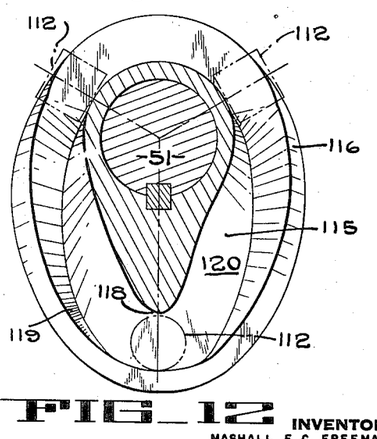
Fig. 12 is a vertical section taken on line 12—12 of Fig. 11.

Each actuating member 107 is rotated about its pivot pin 108 by means of a cam follower sleeve 112 which is rotatably mounted on a stud 113 projecting radially outwardly from the member 107 at right angles to the axis of rotation of the member 107. The follower 112 rides in a camming groove 115 (Figs. 11 and 12) formed in a cam 116 which controls the position of the cup assembly and is keyed to the stationary shaft 51 on which the sleeve shaft 64 is journaled. The cam 116 has a generally oval configuration. The cam groove 115 has sidewalls 118 and 119 (Fig. 12) and a bottom wall 120 which cooperate to define a groove of generally rectangular cross-section. At its lower end the sidewalls 118 and 119 are disposed parallel to the axis of the stationary shaft 51, and, accordingly, when the cam follower 112 passes through this portion of the groove the axis of the follower will be held in a position parallel to the stationary shaft 51. This corresponds to position X (Figs. 3 and 8) wherein the cup assembly is in the pear receiving position. As seen in Fig. 12, the sidewalls and the bottom wall of the groove are progressively inclined so that the rectangular groove is gradually twisted. Accordingly, if the sleeve shaft 64 is rotated in a direction so that the cam follower 112 moves clockwise (Fig. 12) around the stationary shaft 51, the follower 112 will be tilted as soon as it leaves position X (Figs. 3 and 8) due to the inclination of the walls of the groove 115. By the time it has traveled 120° of rotation, the cam follower 112 will be turned from its original position parallel to the horizontal stationary shaft 51 to a position at right angles to the shaft and projecting in a direction radially outwardly of the shaft, as seen in dot-dash lines in Fig. 12. This position corresponds to position Y (Figs. 3 and 8) at which the shank end of the pear is cut off by the bobbing knife 190. It is to be noted that in position Y the axis of the associated cup assembly will be parallel to the horizontal shaft 51 and will be aligned with a flat gauge plate 125 (Fig. 8) which is adjustably mounted on a bracket 126 secured to the housing of the machine.

During the second 120° of rotation, the cam follower 112 is held in the same radial plane so that when the cup assembly arrives at the third station, which corresponds to the above mentioned fruit transfer station Z (Fig. 4), the axis of the cup assembly is still parallel to the shaft 51 and is aligned with the stemming tube 47. During the third 120° rotation, the cam follower 112 is returned to the original horizontal position at the lower end of the cam groove 115, due to the reverse inclination of the groove shown in Fig. 12. Summarizing the movement of the cup assemblies, it will be seen that the sleeve shaft 64 is rotated intermittently in 120° increments. A cup assembly 60 (Fig. 17) starting at the pear receiving station X is swung during the first 120° of shaft rotation, from a position with the cup axis generally normal to a horizontal plane through the shaft 51 to a position (Fig. 18) with the cup axis substantially parallel to the horizontal plane and in alignment with the gauge plate 125. During the second 120° of rotation the axis of the cup assembly is held in the same substantially horizontal position until it reaches the pear push-off position (Fig. 20) in alignment with a stemming tube 47. It will also be understood that, since the mounting flanges 69 of the sleeve shaft 64 are spaced equi-angularly around the sleeve, the three cup assemblies are spaced at equal angular distances. Accordingly, when one cup assembly is at the pear receiving station X, the preceding cup assembly is at the stem-end cut off station Y, and the third cup assembly is at the pear push off station Z.

Figure 8:
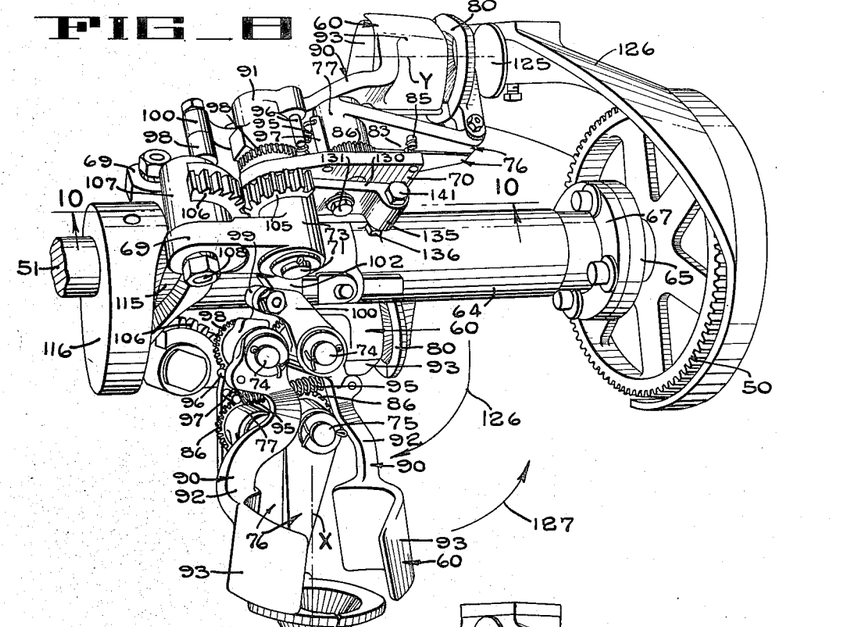
Figs. 8 and 9 are fragmentary perspectives of the pear feeding turret, showing different operational positions of the turret.
Figure 9:
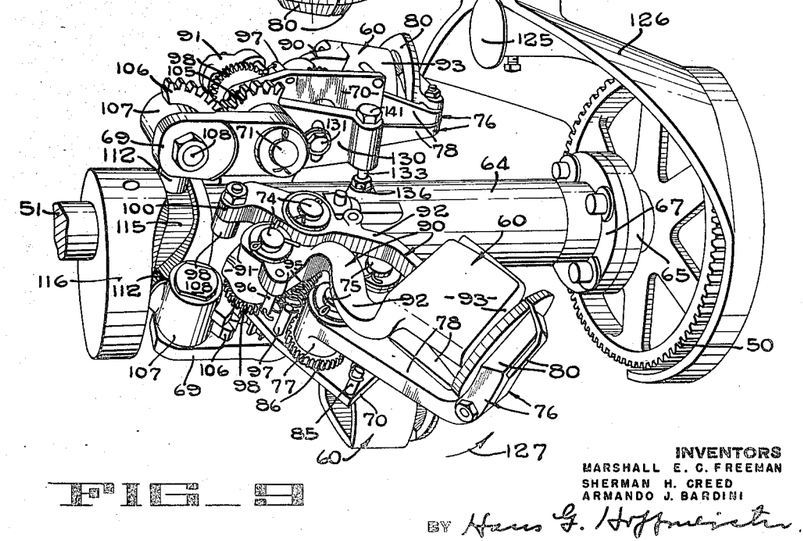

In Fig. 8 one cup assembly 60 has just returned to pear receiving station. It will be noted that this return motion involved a clockwise rotation about the axis of the mounting plate stud 71, indicated by arrow 126, of the entire cup assembly through approximately 90°. Accordingly, it is evident that just before the position illustrated in Fig. 8 was reached, the roller 99 on the upper end of the upper jaw 90 contacted the adjustable abutment member 102 and pivoted the upper jaws to open position whereby a pear may be easily placed in the cup stem end down. As soon as the first 120° of rotation of shaft 64 begins, the cup is pivoted counterclockwise by the actuating member 107, as indicated by arrow 127 in Figs. 8 and 9, and the roller 99 is moved away from the abutment member 102 to permit the tension springs 95 to close the jaws of the cups against the pear held therein.

Figure 10:
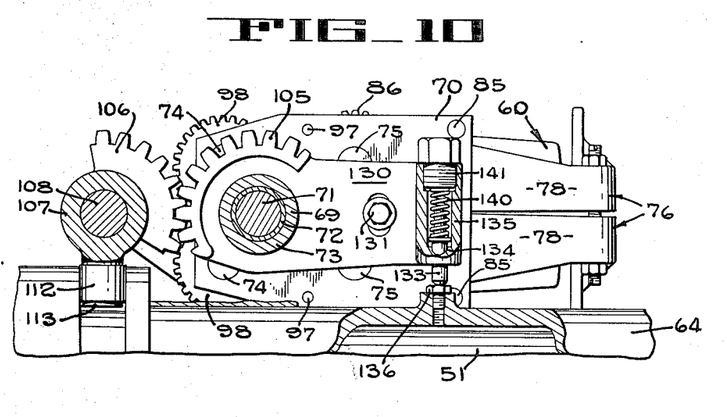
Fig. 10 is a section taken on line 10—10 of Fig. 8.

To prevent backlash of the gear segments 105 and 106 (Figs. 8 and 10) and to thereby assure the positive alignment of the axis of the cup assembly with the stemming tube at the pear transfer station Z, the gear segment 105 is integrally formed on a plate 130 (Fig. 10) which lies close against the rear face of the mounting plate 70 and is adjustably secured thereto by a cap-screw 131. In Fig. 10 the plate 70 has been pivoted in a clockwise direction around the mounting stud 71 by the actuating member 107. As the plate 70 approaches the indicated position, a pin 133, which is slidably supported in a cylindrical opening 134 in a tubular housing 135 of the plate 130, comes into contact with the head of a screw 136 carried on the sleeve shaft 64. A spring 140, disposed in the housing 135 between the pin 133 and a screw 141 threaded in the tubular housing 135, is compressed by the contact of the pin 133 and the screw 136. After the actuating member 107 has brought the plate 70 to the pear transfer station and the rotation of the actuating member 107 is stopped, the spring 140 maintains a pressure on the plate 70 tending to rotate it counterclockwise and to maintain the gear teeth in surface contact.

Referring to Fig. 4, it will be seen that after a pear has been moved from feed station X to cut off station Y by the angular indexing of the sleeve shaft 64, it is held in clamped position in the cup with its stem-blossom axis in aligned position between the stationary gauge plate 125 and a pusher plate 150, the pusher plate 150 is mounted on the end of a rod 151 which is slidably journaled in a support tube 152. While a pear is held in the aligned position at station Y, the pusher plate 150 is moved into contact with the butt end of the pear to firmly urge it into the centering chamber of the cup to center the pear therein and positively press the stem end of the pear against the stationary gauge plate 125. It will be evident, therefore, that the pusher plate 150 must be reciprocated toward and away from the cup assembly immediately after a cup assembly arrives at station Y. To effect the reciprocation of the pusher plate, one end of the pusher plate rod 151 is pivotally connected to an arm 153 (Fig. 13) that is keyed on a shaft 154 rotatably journaled in a cylindrical bearing member 155. The bearing member 155 and the tubular member 152, which supports the push rod 151, are both integrally formed on a bracket 160 which is secured to the sidewall of a movable carriage in the form of a cylindrical cam 161. A tension spring 163 is connected between the arm 153 and a rod 164, adjustably mounted on the bracket 160, and is arranged to pivot the arm 153 and the shaft 154 in a clockwise direction. A second arm 166 is keyed to the shaft 154 and is arranged to abut a stop member 167 which is adjustably mounted on a bracket 170 secured to one of the tie rods 24. Reciprocation of the bracket 160 is obtained by reciprocating the cylindrical cam 161 on which the bracket is mounted. The cylindrical cam is slidably supported on a sleeve 174 which is rotatably mounted on the turret shaft 25. A camming slot 175 in the cam 161 receives a roller 177 which is mounted on the outer end of a rod 178 projecting radially from the sleeve 174. A gear 180 (Fig. 4) is keyed to the sleeve 174 and disposed in mesh with a gear 181 keyed to the continuously rotating shaft 30. The camming slot 175 has a straight portion disposed at right angles to the axis of the cylindrical cam. When the continuously moving roller 177 traverses this straight portion of the slot, there will be no axial movement of the cylindrical cam. Between the ends of the straight portion, the camming slot is inclined in a first axial direction to cause movement of the cylindrical cam in one direction longitudinally of the machine and inclined in the opposite axial direction to cause movement of the cylindrical cam in the opposite direction. It will be evident that the gear drive of the sleeve shaft 174 can be so chosen that the cylindrical cam 161 is reciprocated immediately after a cup assembly is indexed to cut off station Y.

The pusher plate 150 operates in the following manner. When the cylindrical cam 161 starts to move toward the right in Fig. 13, the arm 166 moves away from the stop 167 and the tension spring 163 is permitted to pivot the arm 153 to slide the pusher rod 151 toward the pear. As the cylindrical cam continues its movement toward the right, the pusher plate is brought into contact with the butt end of the pear. In this manner the spring loaded pusher plate 150 urges the pear into centered position in the cup assembly and into positive engagement with the gauge plate 125. After the pear is seated, the pusher plate is retracted to its dwell position shown in Fig. 13.

Figures 14, 15, 16:
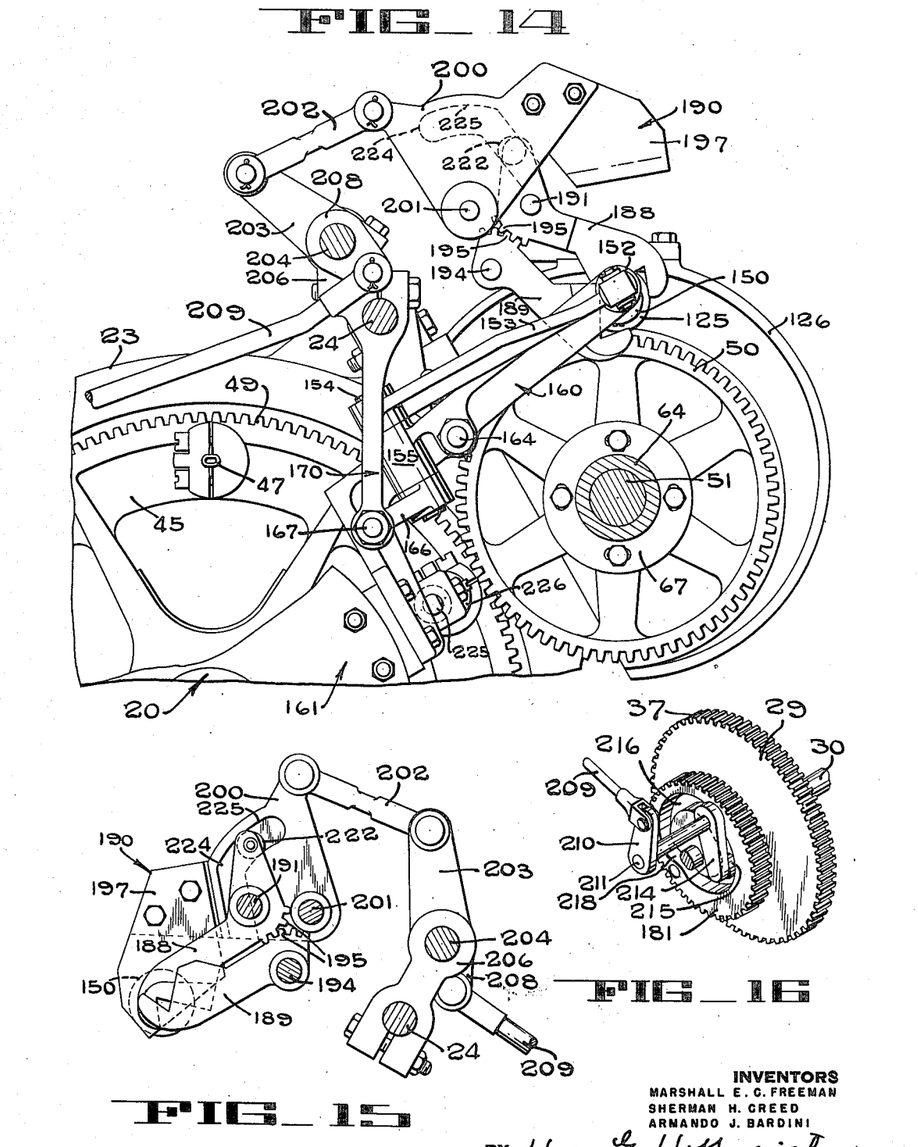
Fig. 14 is a section taken on line 14—14 of Fig. 13.
Fig. 15 is a section, similar to Fig. 14, showing a portion of the knife assembly of Fig. 14 in a different phase of operation.
Fig. 16 is a perspective of a part of the machine looking in the direction of arrow 16 of Fig. 4.

When the pear is firmly seated in the cup with its stem end abutting the gauge plate 125, a pair of clamping jaws 188 and 189 (Fig. 13) are moved from an open position, shown in Fig. 14 to a closed position, shown in Fig. 15, wherein the jaws grip the stem end of the pear to hold it in fixed position while a knife 190 moves from the raised position of Fig. 14 to the lower position of Fig. 15. The clamping jaw 188 is in the form of a bellcrank pivotally mounted by a pin 191 on a boss 192 (Fig. 2) formed on the bracket 126. The jaw 189 is pivotally mounted by a pin 194 (Fig. 14) on the bracket 126. Intermeshing gear teeth 195 are formed on the jaws 188 and 189 to effect simultaneous pivoting of the jaws. The knife 190 comprises a body portion 200 rotatably mounted by means of a pin 201 on a boss 193 (Fig. 2) on the bracket 126. A cutting blade 197 (Fig. 14) is secured to one side of the body portion 200 and a link 202 is pivotally connected to the other side of the body portion. The link 202 is pivotally connected to an arm 203 that is keyed to a shaft 204. The shaft extends longitudinally of the machine and is journalled for rotation in spaced bearings 206 (Fig. 2) which are secured to one of the tie rods 24. A lever 208 (Fig. 14) is keyed at one end to the shaft 204 and is pivotally connected at its opposite end to a link 209 that extends transversely of the machine, as seen in Fig. 2, and is pivotally connected to a lever 210 which, in turn, is keyed to a shaft 211 journalled in the gear housing 27. A cam follower lever 214 (Fig. 16) is keyed to the shaft 211, said follower having a roller 215 arranged to ride in a groove 216 formed in the face of the gear 181 which continuously rotates with the shaft 30. The cam groove 216 has a camming surface 218 designed to actuate the lever 214 and rotate the shaft 211 in a direction to pull the link 209 toward the left as seen in Fig. 14. This movement of the link 209 causes clockwise rotation of the longitudinal shaft 204 and downward pivoting movement of the knife 190. As the knife moves downwardly, a roller follower 222 (Fig. 14) pivotally mounted on one arm of the bellcrank clamping arm 188 rides up a groove 224 in the body portion 200 of the knife and is guided to pivot the clamping arm 188 downwardly.

Since the clamping arms 188 and 189 are geared together, they will be moved simultaneously to closed position just prior to the time the knife blade 197 reaches the pear. The groove 224 has a portion 225 disposed on the arc of a circle with the pin 201 as center. When the roller 222 reaches this portion of the groove it will be held in locked position as the knife continues its cutting movement. In Fig. 13 the relative positioning, longitudinally of the machine, of knife 190 and the clamping jaws 188 and 189 is shown. It will be evident that when the jaws clamp the stem end of the pear, the knife will make a cut through the pear alongside the jaws but on the side of the jaws closest to the butt end of the pear. Since the pear is firmly pressed against the gauge plate 125 and, since the distance, measured longitudinally of the machine, from the knife to the gauge plate remains fixed, each pear will have the same amount cut off its stem end, leaving the main part of the pear firmly held in the jaws of the cup assembly.

Shortly after the stem end of the pear is cut off, the sleeve shaft 64 is angularly indexed to move the cup assembly from cut-off position Y to pear transfer position Z (Fig. 4) at which position the stem-blossom axis of the pear is aligned with the stemming tube 47 which has been indexed by turret 45 to position A (Fig. 3). While the pear (shown in phantom lines Fig. 13) is held in this position a pusher 225, which is adjustably mounted on the bracket 160 of the reciprocable cylindrical cam, is carried forwardly to engage the butt end of the pear and force it through the cup assembly onto the stemming tube 47 against the resistance of resiliently closed upper and lower jaws. The end portion 226 of the pusher 225 is of a size to pass freely through the opening in the lower end of the cup, even when the cup is in closed position. Accordingly, in the push-off stroke the end portion 226 moves entirely through the cup assembly and assures the complete impaling of the pear on the stemming tube. After the pear has been removed from the cup, the cup will be returned to the pear feed station X by the next angular indexing of the sleeve shaft 64.

*Operation*

When the electric motor 39 (Fig. 4) is operated, continuous rotation of the main drive shaft 30 is effected. Through the Geneva drive and shaft 25, the turret 45 is intermittently rotated in one-sixth of a revolution increments to move each stemming tube 47 successively through the various processing stations A, B, C, D, E and F (Fig. 3), station A being the station at which a pear is transferred from a cup assembly to a stemming tube. Each time the turret 45 is rotated one-sixth of a revolution the sleeve shaft 64, on which the three cup assemblies 60 are mounted, is rotated one-third of a revolution around the stationary shaft 51 to progressively move a cup assembly from station X, at which a pear is placed in the cup, to the stem-end cut off station Y and then to the pear transfer station Z. During the periods intervening between each intermittent rotation of the turret 45 and the sleeve shaft 64, the cam cylinder 161 (Fig. 4) is advanced and retracted by the action of the camming roller 177, on the continuously rotating tubular shaft 174, with the slot 175 in the cylindrical cam.

A complete cycle of one cup assembly 60 will be described in connection with Figs. 8 and 11 and the diagrammatic views Figs. 17 to 22, inclusive. When the empty cup assembly 60 approaches the pear feeding station X, the cam roller follower 99 (Fig. 8) engages the stationary abutment member 102 causing the upper jaw arms 92 to move to open position to facilitate the positioning of a pear therein, stem end down, by the operation. Shortly thereafter, the shaft 64 is angularly indexed causing the cup assembly 60 to be pivoted counterclockwise (Fig. 8) due to the engagement of the actuating member 107 in the camming groove of the stationary cam 116. As the cup assembly begins this counterclockwise movement, the cam roller follower 99 moves away from the stationary abutment member 102, thereby permitting the tension springs 95 to close the upper jaws around the pear.

Figure 17:
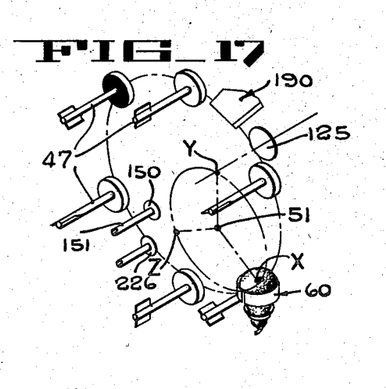
Figs. 17 to 22 inclusive are a series of diagrammatic operational view showing consecutive stages in the movement of a cup assembly during a typical operating cycle.
Figure 18:
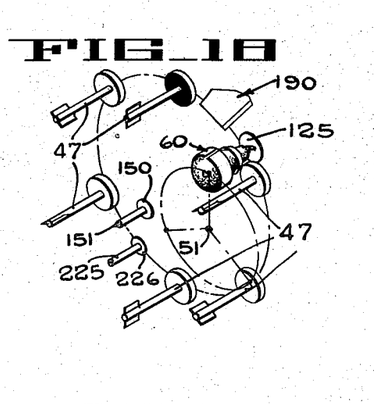

As best seen in Figs. 17 and 18, the cup assembly 60 is swung from the vertical position of Fig. 17 to the horizontal position of Fig. 18 wherein the pear is held in fixed position in alignment with the gauging plate 125. While the pear is held in this position, the pusher plate 150 is advanced by the cylindrical cam 161 and the spring 163 to contact the butt end of the pear and push it to centered position in the centering chamber of the cup with the stem end of the pear firmly pressed against the gauge plate 125. While the pear is held in this position, the knife 190 and the clamping jaws 188 and 189 are swung downwardly (Fig. 19) to engage the stem end of the pear and cut off a predetermined portion thereof. The movement of the knife and the clamping arms is obtained by the movement of the roller follower 215 (Fig. 16) in the camming groove 216, which movement is transmitted through the arm 214, the shaft 211, the arm 210, the transverse rod 209, the arm 208 (Fig. 12), the shaft 204, the arm 203 and the link 202.

Figure 19:
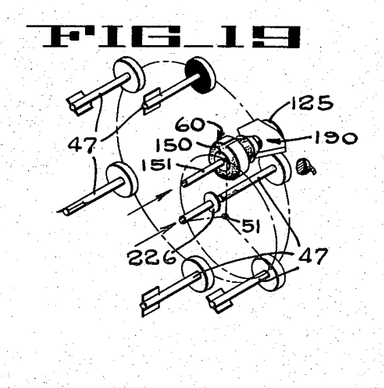
Figure 20:
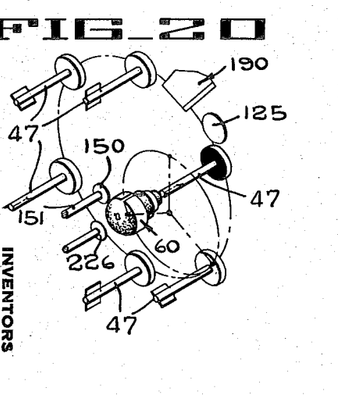
Figure 21:
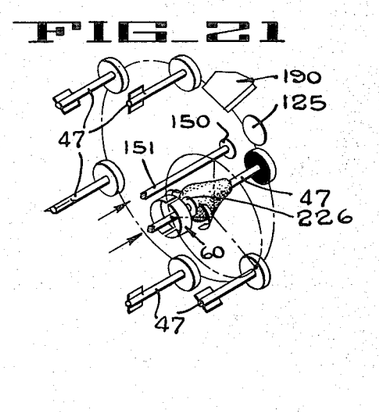
Figure 22:
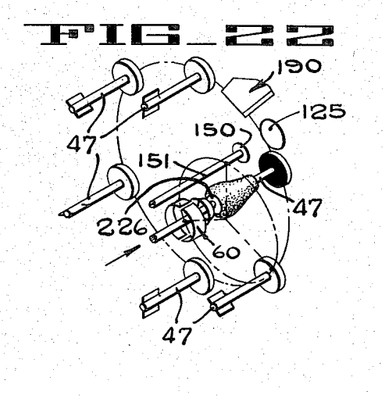

When the stem end of the pear has been cut off, the cup assembly is indexed to pear transfer station Z (Fig. 20) where pusher 225 moves into contact with the butt end of the pear and pushes it through the resilient jaws of the cup and onto the aligned stemming tube, as shown in Figs. 19 and 20.

From the foregoing description it will be evident that the pear machine of the present invention provides a simple, efficient means for feeding a pear to the stemming tube of a pear preparation machine. The use of a cam controlled mechanism, which swings the cup assembly in one continuous movement from a pear receiving position to a position aligned with the gauge plate, eliminates the need for separate linkages for accomplishing this result.

It will be understood that the invention is not limited to the precise details of construction illustrated but that various modifications and variations may be resorted to without departing from the scope or spirit of the invention, and we deem ourselves entitled to all such modifications and variations as come within the scope of the appended claims.

Having thus described our invention what we claim as new and desire to protect by Letters Patent is:

1. In a fruit preparation machine, the combination of a rotatable shaft, a cup assembly pivotally mounted on said shaft, said cup assembly having movable jaws, a control member spaced from said cup assembly, actuating means disposed between said control member and said cup assembly and operatively associated therewith to pivot said cup assembly relative to said shaft through a first range of angular movement to a pear receiving position in response to rotation of said shaft, means operably connected between said shaft and said jaws for opening said jaws during said first range of movement of said cup assembly, means defining a stem-end cut off station adjacent said shaft, said actuating means including means for moving said cup assembly through a second range of angular movement to said cut off station, and spring means connected between said jaws for closing said jaws during said second range of movement of said cup assembly.

2. In a fruit preparation machine, the combination of a support means, a shaft rotatable on said support means, a cup assembly pivotally mounted on said shaft and movable in a rotary path therewith and having pivotally mounted jaws, means for rotating said shaft through predetermined increments of rotation, a cam mounted on said support means and having a camming groove encircling the axis of rotation of said shaft, means interconnecting said jaws for simultaneous pivoting movement, gear means secured to said cup assembly, an actuating member pivotally mounted on said shaft and having a gear segment in mesh with said gear means and having a cam follower disposed in said cam groove, said actuating member being arranged to pivot said cup assembly as said cam follower moves along said cam groove during rotation of said shaft, and means operably connected between said jaws and said shaft for moving said jaws to open fruit receiving position as said cup assembly is pivoted.

3. A feed mechanism for a fruit preparation machine comprising a stationary support rod, a tubular shaft journalled for rotation on said support rod, a flange on said shaft projecting outwardly from the surface thereof, a mounting plate pivotally mounted on said flange, a lower jaw assembly pivotally mounted on one face of said mounting plate, an upper jaw assembly pivotally mounted on said one face of said plate immediately above said lower jaw assembly, a gear segment secured to the other face of said mounting plate, a stationary cam mounted on said support and having a cam groove, an actuating member pivotally mounted on said flange, a gear segment formed on said actuating member and disposed in mesh with the gear segment on said plate for effecting pivoting movement of said plate when said actuating member is pivoted, and a cam follower secured to said actuating member and extending into operative engagement with said cam groove, said groove being arranged to pivot said actuating member as said member is moved in a circular path during rotation of said shaft.

4. A feed mechanism for a fruit preparation machine comprising a support frame, a gauge plate mounted transversely of said frame adjacent one end of the frame, a carriage mounted for reciprocating movement along a path longitudinally of said frame, a generally cylindrical fruit positioning cup having its axis normal to said gauge plate and in alignment therewith and adapted to hold a pear adjacent said gauge plate with the stem-blossom axis of the pear disposed longitudinally of said frame and in alignment with said gauge plate, a pusher member having a first portion pivotally mounted on said carriage and a second portion in sliding engagement with said carriage and movable longitudinally of said frame and disposed in a path in alignment with the axis of the pear, a spring connected between said carriage and the pivotal portion of said pusher member and arranged to slide said pusher member in said carriage a predetermined distance towards said gauge plate, and power means connected to said carriage for moving said carriage along said longitudinal path to carry said pusher bodily into engagement with the end of the pear in said pear holding means.

5. A feed mechanism for a fruit preparation machine comprising a support, an elongated rod rotatably mounted in said support, a knife keyed to said rod for movement in a plane normal to said rod as said rod is rotated, means defining a camming groove in one face of said knife, means for positioning a pear in the path of travel of said knife with the stem-blossom axis of the pear substantially parallel to said rod, a pair of clamping arms pivotally mounted on said support adjacent said knife and having spaced end portions disposed on opposite sides of a pear held in said positioning means, a cam follower carried by one of said arms and operatively engaged in the camming groove of said knife, relative movement of said follower and said groove being effective to pivot said clamping arms to closed position, and means for rotating said rod to move said follower relative to said groove.

6. A feed mechanism for a fruit preparation machine comprising a support frame, a rod journalled for rotation in said frame, a knife keyed to said rod and movable in a plane normal to said rod as said rod is rotated, means for holding a pear in fixed position in the path of movement of said knife and with the stem-blossom axis of the pear substantially parallel to said rod, a pair of interconnected clamping arms pivotally mounted on said frame and movable in a plane adjacent to and parallel with the plane of said knife, said clamping arms having end portions disposed on opposite sides of the stem end of a pear held in said fixed position, cam means operatively connected between said knife and said clamping arms arranged to actuate said arms as said knife is moved toward said pear and move said end portions into gripping engagement with the pear, and means for rotating said rod.

7. In a fruit preparation machine, the combination of a rotatable shaft, a cup assembly pivotally mounted on said shaft for movement as a unit with said shaft and for movement relative to said shaft between a first position in which the axis of the cup assembly is disposed generally parallel to the axis of the shaft and a second position in which said cup axis is in a plane disposed generally transverse to said shaft axis, said cup assembly having a pair of jaws movable between open and closed positions and a jaw-opening member operatively associated with said jaws, a control member spaced from said cup assembly, actuating means disposed between said control member and said cup assembly and operatively associated therewith to pivot said cup assembly relative to said shaft between said first and second positions in response to rotation of said shaft, and abutment means fixed to said shaft in spaced relation to said jaws when said jaws are in closed position, the jaw-opening member of said jaw assembly being movable into contact with said abutment means during said pivoting movement of said cup assembly between said first and second positions whereby to move said jaws to said open position for reception of fruit therein.

8. In a fruit preparation machine, the combination of a rotatable shaft, a flange extending longitudinally of the shaft and projecting outwardly from the outer surface of said shaft, a cup assembly pivotally mounted on said flange for movement between a first position in which the axis of said cup assembly is disposed generally parallel to the axis of said shaft to a second position in which the axis of the cups is in a plane disposed generally transverse to the axis of said shaft, said cup assembly being movable in a rotary path with said flange and having movable jaws interconnected for movement between open and closed positions, one of said jaws having a jaw-opening member spaced from the pivot axis of the jaw, means for intermittently angularly indexing said shaft, a cam adjacent said cup assembly, an actuating member mounted on said flange and operatively connected between said cup and said cam to pivot said cup relative to said flange between said first and second positions in response to rotation of said shaft, an abutment member fixed to said shaft in spaced relation to said jaws when said jaws are in closed position and arranged to be contacted by said jaw-opening member as said cup assembly is pivoted between said first and second positions in response to a first angular movement of said shaft whereby to move said jaws to open position for the reception of fruit therein, and means connected between said jaws for closing said jaws during the succeeding pivotal movement of said cup assembly between said first and second positions.

9. A feed mechanism for a fruit preparation machine comprising a support means, a shaft rotatable on said support means, a cup assembly pivotally mounted on said shaft for movement between a first position in which the axis of the cup is disposed generally parallel to the axis of said shaft and a second position in which the axis of the cup is disposed in a plane generally transverse to said shaft axis, and for movement in a rotary path with said shaft, said cup assembly having a pair of jaws movable between open and closed positions, one of said jaws having a jaw-opening member spaced from the pivot axis of the jaw, means for rotating said shaft through predetermined increments of rotation, first cam means operatively connected between said cup assembly and said support means for pivoting said cup assembly between said first and second positions during movement of said cup assembly in said rotary path in response to rotation of said shaft through a first increment of rotation, and second cam means fixed to said shaft in spaced relation to said jaws when said jaws are in closed position and arranged to be contacted by said jaw-opening member for moving said jaws to open fruit receiving position as said cup assembly is moved between said first and second positions during rotation of said shaft through a second increment of rotation.

10. In a fruit preparation machine, the combination of a support means, a shaft rotatable on said support means, a cup assembly pivotally mounted on said shaft for movement from a first position in which the axis of the cup assembly is generally parallel to the axis of said shaft to a second position in which the axis of the cup is in a plane disposed generally transverse to said shaft axis, and for movement with said shaft in a rotary path about the shaft axis, said cup assembly having pivotal jaws movable between open and closed positions, means interconnecting said jaws for simultaneous pivoting movement, means for rotating said shaft through predetermined increments of rotation, cam means operatively connected between said cup assembly and said support means for pivoting said cup assembly between said first and second positions in response to rotation of said shaft, an abutment fixed on said shaft, and a cup control member on one of said jaws spaced from said abutment means when said jaws are in closed position and arranged to be moved into engagement with said abutment to effect opening movement of said jaws as said cup assembly is pivoted between said first and second positions.

11. In a fruit preparation machine, the combination of a support means, a shaft rotatable on said support means, a cup assembly pivotally mounted on said shaft for movement from a first position in which the axis of the cup assembly is disposed generally parallel to the axis of said shaft to a second position in which the axis of the cup assembly is in a plane disposed generally transverse to said shaft axis, and for movement with said shaft in a rotary path about said shaft axis, said cup assembly including a pair of cooperating pivotally mounted jaws movable between open and closed positions, means interconnecting said jaws for simultaneous pivoting movement, means for rotating said shaft through predetermined increments of rotation, first cam means operatively connected between said cup assembly and said support means for pivoting said cup assembly between said first and second positions in response to rotation of said shaft relative to said support means, an arm projecting from one of said pivotable jaws, a roller mounted on said arm and spaced from the pivot axis of said one jaw, and an abutment fixed on said shaft in spaced relation to said roller when said jaws are in closed position and disposed in the path of movement of said roller as said cup assembly is pivoted by said first cam means from said first to said second position whereby to cause pivoting of said jaws to open position upon contact of said roller with said abutment.

12. A feed mechanism for a fruit preparation machine comprising a support, a flat vertically disposed gauge plate mounted on said support, a shaft mounted for rotation on said support, drive means for intermittently rotating said shaft to successive angular positions, a pair of cooperating jaws pivotally mounted on said shaft and having slanted inner walls defining in their closed position an open ended frusto-conical centering chamber, resilient means urging said jaws to closed position, means mounting said jaws for swinging movement as a unit from a feed position for receiving a pear stem end down in which the axis of said centering chamber is substantially vertical to a gauging position in which said axis is substantially normal to said vertical gauge plate and in alignment therewith and the stem end of the pear is facing said plate, cam means operatively connected between said shaft and said jaws for swinging said jaws to said feed position during rotary movement of said shaft to a first angular position and for swinging said jaws to said gauging position during rotary movement of said shaft to a second angular position, a pusher member mounted on said support in alignment with the axis of the chamber when the axis is aligned with the plate, said pusher member being arranged for movement toward said plate and into contact with the butt end of a pear in the chamber, means operatively connected to said pusher member for moving said member toward said plate and into contact with the butt end of the pear to seat the pear in the centering chamber and move the stem end of the pear against said gauge plate, and a cutter mounted adjacent said gauge plate for movement into cutting engagement with the stem end of a pear held against said gauge plate.

References Cited in the file of this patent

UNITED STATES PATENTS

| | | |
|---|---|---|
| 1,112,130 | Ginaca | Sept. 29, 1914 |
| 1,745,158 | Fish | Jan. 28, 1930 |
| 1,958,846 | Christensen | May 15, 1934 |
| 1,989,090 | Ewald | Jan. 29, 1935 |
| 2,139,704 | Thompson et al. | Dec. 13, 1938 |
| 2,274,020 | Weightman et al. | Feb. 24, 1942 |
| 2,321,590 | Ewald | June 15, 1943 |
| 2,415,997 | Eldred | Feb. 18, 1947 |
| 2,418,827 | Ewald | Apr. 15, 1947 |
| 2,502,797 | Luhdorff et al. | Apr. 4, 1950 |